US006668928B2

(12) United States Patent
Brothers

(10) Patent No.: US 6,668,928 B2
(45) Date of Patent: Dec. 30, 2003

(54) RESILIENT CEMENT

(75) Inventor: Lance E. Brothers, Chickasha, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/006,109

(22) Filed: Dec. 4, 2001

(65) Prior Publication Data

US 2003/0121659 A1 Jul. 3, 2003

(51) Int. Cl.$^7$ .............................................. E21B 33/13
(52) U.S. Cl. ....................... 166/292; 166/285
(58) Field of Search ................. 166/285, 292, 166/293, 294, 295

(56) References Cited

U.S. PATENT DOCUMENTS

| | | | |
|---|---|---|---|
| 3,782,466 A | 1/1974 | Lawson et al. | 166/254 |
| 5,135,577 A | 8/1992 | Brothers | 106/724 |
| 5,159,980 A | 11/1992 | Onan et al. | 166/294 |
| 5,293,938 A | 3/1994 | Onan et al. | 166/293 |
| 5,389,706 A | 2/1995 | Heathman et al. | 524/5 |
| 5,588,488 A | 12/1996 | Vijn et al. | 166/293 |
| 5,667,011 A | 9/1997 | Gill et al. | 166/295 |
| 5,688,844 A | 11/1997 | Chatterji et al. | 524/8 |
| 5,718,288 A | 2/1998 | Bertet et al. | 166/287 |
| 5,738,463 A | 4/1998 | Onan | 405/154 |
| 5,794,702 A | 8/1998 | Nobileau | 166/380 |
| 5,795,924 A | 8/1998 | Chatterji et al. | 523/130 |
| 5,820,670 A | 10/1998 | Chatterji et al. | 106/727 |
| 5,833,001 A | 11/1998 | Song et al. | 166/287 |
| 5,913,364 A | 6/1999 | Sweatman | 166/281 |
| 5,945,387 A | 8/1999 | Chatterji et al. | 507/224 |
| 5,964,293 A | 10/1999 | Chatterji et al. | 166/294 |
| 6,098,711 A | 8/2000 | Chatterji et al. | 166/294 |
| 6,167,967 B1 | 1/2001 | Sweatman | 166/281 |
| 6,234,251 B1 | 5/2001 | Chatterji et al. | 166/295 |
| 6,258,757 B1 | 7/2001 | Sweatman et al. | 507/219 |
| 6,271,181 B1 | 8/2001 | Chatterji et al. | 507/219 |
| 6,328,106 B1 | 12/2001 | Griffith et al. | 166/295 |
| 6,330,917 B2 | 12/2001 | Chatterji et al. | 166/295 |
| 6,431,282 B1 | 8/2002 | Bosma et al. | 166/28 |
| 6,448,206 B1 | 9/2002 | Griffith et al. | 507/219 |

FOREIGN PATENT DOCUMENTS

| | | | |
|---|---|---|---|
| EP | 0 520 839 A1 | 12/1992 | E21B/33/12 |
| EP | 0 879 933 A2 | 11/1998 | E21B/33/138 |

*Primary Examiner*—David Bagnell
*Assistant Examiner*—Jennifer Dougherty
(74) *Attorney, Agent, or Firm*—Craig W. Roddy; Warren B. Kice

(57) ABSTRACT

A method and composition is provided for sealing a subterranean zone penetrated by a well bore, wherein the composition basically comprises a mixture of latex, dithio carbamate, zinc oxide, and sulfur.

54 Claims, No Drawings

RESILIENT CEMENT

BACKGROUND

The present embodiment relates generally to a composition for sealing a subterranean zone penetrated by a well bore.

In the drilling and completion of an oil or gas well, a composition is often introduced in the well bore for cementing casing or pipe strings. In this process, known as "primary cementing," a composition is pumped into the annular space between the walls of the well bore and the pipe string. The composition sets in the annular space, supporting and positioning the pipe string, and forming a substantially impermeable barrier which divides the well bore into subterranean zones. After primary cementing, the undesirable migration of fluids between zones is prevented. Likewise, compositions are often subsequently introduced into a subterranean zone for remedial operations to recover circulation or to plug the well bore. Most remedial operations comprise introducing a composition into the well bore to reestablish a seal between the zones.

Previously, a variety of cement compositions have been used for cementing. However, cement is undesirable for use with expandable casing. After the expandable casing is placed down hole, a mandrel is run through the casing to expand the casing, and expansions up to twenty five percent are possible. As cement is incompressible, expansion of the casing can lead to crushing of the cement, and consequent loss of effectiveness regarding the zones. Therefore, a composition with comparable strength to cement, but greater elasticity and compressibility is required for cementing expandable casing.

DESCRIPTION

A sealing composition according to the present embodiment basically comprises a mixture of latex, dithio carbamate, zinc oxide, and sulfur, for sealing a subterranean zone penetrated by a well bore. The sulfur containing component vulcanizes the latex to form a solid mass which seals the zone.

In a first embodiment, the composition comprises a mixture of latex, dithio carbamate, zinc oxide, and sulfur. Preferably, the amount of latex is maintained at a 41–90 percent ratio by weight of the composition. The dithio carbamate is preferably present in an amount that is 0.1–2 percent of the latex by weight. The zinc oxide is preferably present in an amount that is 2–5 percent of the latex by weight. The sulfur is preferably present in an amount that is 1–4 percent of the latex by weight.

The composition may further comprise stearic acid. The stearic acid is preferably present in an amount that is 0.1–2 percent of the latex by weight.

The composition may further comprise a weighting agent. The weighting agent is preferably present in an amount that is 0.1–150 percent of the latex by weight.

The composition may further comprise acetylenic alcohol for defoaming, such as is available from Halliburton Energy Services of Duncan, Okla., under the trademark "D-AIR3™." The acetylenic alcohol is preferably present in an amount that is 0.001–0.2 percent of the latex by weight.

In a second embodiment, the composition comprises a mixture of latex, dithio carbamate, zinc oxide, sulfur, and a foaming agent, wherein the mixture is foamed. Preferably, the amount of latex is maintained at a 41–90 percent ratio by weight of the composition. The dithio carbamate is preferably present in an amount that is 0.1–2 percent of the latex by weight. The zinc oxide is preferably present in an amount that is 2–5 percent of the latex by weight. The sulfur is preferably present in an amount that is 12 percent of the latex by weight. The foaming agent is preferably present in an amount that is 2–4 percent of the latex by weight.

The composition may further comprise stearic acid. The stearic acid is preferably present in an amount that is 0.1–2 percent of the latex by weight.

The composition may further comprise a weighting agent. The weighting agent is preferably present in an amount that is 0.1–150 percent of the latex by weight.

As will be understood by those skilled in the art, the latex for either embodiment may be any of a variety of well known rubber materials commercially available which contain unsaturation in the backbone of the polymer. These include natural rubber (cis-1,4-polyisoprene), modified types thereof, synthetic polymers, and blends of the foregoing. The synthetic polymers include styrene/butadiene rubber, cis-1,4-polybutadiene, neoprene rubber, acrylonitrile styrene/butadiene rubber, and cis-1,4-polyisoprenerubber.

For either embodiment, the composition preferably includes a latex comprising a styrene/butadiene copolymer latex emulsion prepared by emulsion polymerization. The weight ratio of styrene to butadiene in the latex can range from 10:90 to 90:10. The emulsion is a colloidal dispersion of the copolymer. The colloidal dispersion includes water from about 40–70% by weight of the emulsion. In addition to the dispersed copolymer, the latex often includes small quantities of an emulsifier, polymerization catalysts, chain modifying agents and the like. Also, styrene/butadiene latexes are often commercially produced as terpolymer latexes which include up to about 3% by weight of a third monomer to assist in stabilizing the latex emulsions. Non-ionic groups which exhibit stearic effects and which contain long ethoxylate or hydrocarbon tails can also be present.

Most preferably for either embodiments, the composition includes a latex with a styrene/butadiene weight ratio of about 25:75, with the styrene/butadiene copolymer suspended in a 50% by weight aqueous emulsion, available from Halliburton Energy Services of Duncan, Okla., under the trademark "LATEX 2000™."

The weighting agent for either embodiment may be silica flour, such as is available from Halliburton Energy Services of Duncan, Okla., under the trademark "SSA-1™." Alternatively, the weighting agent may be manganese oxide weighting additive, available from Halliburton Energy Services of Duncan, Okla., under the trademark "MICROMAX™." Alternatively, the weighting agent may be crystalline silica with an average particle size of 10 microns, available from Halliburton Energy Services of Duncan, Okla., under the trademark "MICROSAND™."

Dithio carbamate for either embodiment is available from Halliburton Energy Services of Duncan, under the trademark "FLEXCEM COMPONENT L™."

The foaming agent for the second embodiment may be an ethoxylated alcohol ether sulfate surfactant, which is available from Halliburton Energy Services of Duncan, under the trademark "ZONE SEAL 2000 ™." The ZONE SEAL 2000 surfactant is the subject of U.S. Pat. No. 6,063,738, the entire disclosure of which is incorporated herein as if reproduced in its entirety. Alternatively, the foaming agent may be an amidopropylbetaine surfactant, which is available from Halliburton Energy Services of Duncan, under the trademark "HC-2™." The HC-2™ surfactant is discussed in U.S. Pat. No. 5,588,489, the entire disclosure of which is incorporated herein as if reproduced in its entirety.

The following examples are illustrative of the methods and compositions discussed above.

EXAMPLE 1

To test curing properties of the first embodiment, 450 grams of LATEX 2000™ latex, and components in the amounts listed in TABLE 1 were added to form three batches. Each of the batches was mixed in a Waring blender. The batches were poured into receptacles and incubated at the temperatures listed.

TABLE 1

| Component | Batch 1 | Batch 2 | Batch 3 |
|---|---|---|---|
| FLEXCEM COMPONENT L ™ dithio carbamate | 5.6 g | 5.6 g | 4.5 g |
| Zinc Oxide | 9 g | 9 g | 22.5 g |
| Sulfur | 9 g | 9 g | 13.5 g |
| Stearic acid | — | 9 g | 4.5 g |
| D-AIR3 ™ acetylenic alcohol | 14.6 g | 14.6 g | 3 g |
| SSA-1 ™ silica flour | 600 g | 600 g | — |
| Comments | No Set; 48 hr at 80° F. | Set; 48 hr at 150° F. | Set; 5.5 hr at 150° F. |

TABLE 1 shows that the second and third batches set.

EXAMPLE 2

To test curing properties of the first embodiment with a different weighting agent, 100 grams of LATEX 2000™ latex (with the exception of Batch 8), and components in the amounts listed in TABLE 2 (including a $C_{15}$ alcohol ethoxylated with 15 moles of ethylene oxide, which is available from Halliburton Energy Services of Duncan, under the trademark "434B™") were added to form eight batches. Each of the batches was mixed in a Waring blender. The batches were poured into receptacles and incubated at the temperatures listed.

TABLE 2 shows that the fifth batch set without stearic acid.

EXAMPLE 3

To test curing properties of the second embodiment, LATEX 2000™ latex in the amounts listed in TABLES 3A and 3B, were mixed with components in the amounts listed in TABLES 3A and 3B (including a $C_{15}$ alcohol ethoxylated with 40 moles of ethylene oxide, which is available from Halliburton Energy Services of Duncan, under the trademark "434C™;" a sodium salt of alpha-olefinic sulfonic acid surfactant which is discussed in U.S. Pat. No. 5,588,489, the entire disclosure of which is incorporated herein as if reproduced in its entirety, and is available from Halliburton Energy Services of Duncan, under the trademark "AQF-2™;" an alcohol ether sulfate surfactant which is discussed in U.S. Pat. No. 5,588,489, the entire disclosure of which is incorporated herein as if reproduced in its entirety, and is available from Halliburton Energy Services of Duncan, under the trademark "HOWCO SUDS™;" and ammonium decasulfate, which is available from Halliburton Energy Services of Duncan, under the trademark "CFAS™") were added to form twelve batches. Each of the batches was mixed in a Waring blender with a sealable metal canister. The batches were poured into receptacles and incubated at the temperatures listed.

TABLE 2

| Component | Batch 1 | Batch 2 | Batch 3 | Batch 4 | Batch 5 | Batch 6 | Batch 7 | Batch 8 (500 g latex) |
|---|---|---|---|---|---|---|---|---|
| FLEXCEM COMPONENT L ™ dithio carbamate | 5.6 g | 5.6 g | 0.75 g | 0.75 g | 4.5 g | 4.5 g | 1.5 g | 2 g |
| Zinc Oxide | 9 g | 9 g | 14 g | 14 g | 22.5 g | 22.5 g | 14 g | 15 g |
| Sulfur | 9 g | 9 g | 9 g | 9 g | 13.5 g | 13.5 g | 9 g | 10 g |
| Stearic acid | — | — | 4.5 g | — | — | — | — | — |
| D-AIR3 ™ acetylenic alcohol | 14.6 g | 14.6 g | 3 g | 3 g | 3 g | 3 g | — | 5 g |
| MICROMAX ™ manganese oxide (15.3 lb/gal) | 600 g | 600 g | 400 g | 400 g | 400 g | 400 g | 400 g | 400 g |
| 434B ™ ethoxylated alcohol | — | 45 g | 45 g | 45 g | 45 g | 45 g | 26 g | 10 g |
| Comments | Latex inverted | No set; 48 hr at 80° F. | No set; 24 hr at 140° F. | No set; 24 hr at 140° F. | Set; 48 hr at 140° F. | No set; 48 hr at 200° F. | No set; 24 hr at 200° F. | No set; 72 hr at 200° F. |

TABLE 3A

| Components | Batch 1 | Batch 2 | Batch 3 | Batch 4 | Batch 5 | Batch 6 | Batch 7 |
|---|---|---|---|---|---|---|---|
| LATEX 2000 ™ latex | 450 g | 450 g | 450 g | 450 g | 450 g | 600 g | 600 g |
| FLEXCEM COMPONENT L ™ dithio carbamate | 5.6 g | 5.6 g | 5.6 g | 5.6 g | 5.6 g | 6 g | 6 g |
| Zinc Oxide | 9 g | 9 g | 9 g | 9 g | 9 g | 30 g | 30 g |
| Sulfur | 9 g | 9 g | 9 g | 9 g | 9 g | 18 g | 18 g |
| Stearic acid | 9 g | 9 g | 9 g | 9 g | 9 g | — | — |
| D-AIR3 ™ acetylenic alcohol | 14.6 g | 14.6 g | — | — | — | — | — |
| SSA-1 ™ silica flour | 600 g | 600 g | — | — | — | — | — |
| ZONE SEAL 2000 ™ surfactant | 9 g | 18 g | — | 20 g | 20 g | — | — |
| MICROSAND ™ crystalline silica | — | — | 600 g | 600 g | 600 g | — | — |
| 434C ™ ethoxylated alcohol | — | — | 45 g | 45 g | 45 g | — | — |
| AQF-2 ™ surfactant | — | — | 9 g | — | — | — | — |
| HC-2 ™ surfactant | — | — | 4.5 g | — | — | 10 g | 5 g |
| HOWCO SUDS ™ surfactant | — | — | — | — | — | — | 10 g |
| CFAS ™ ammonium decasulfate | — | — | — | — | — | — | — |
| Comments | Unstable foam | Unstable foam | Unstable foam | Unstable foam | Unstable foam | Unstable foam | Unstable foam |

TABLE 3B

| Components | Batch 8 | Batch 9 | Batch 10 | Batch 11 | Batch 12 |
|---|---|---|---|---|---|
| LATEX 2000 ™ latex | 600 g | 600 g | 600 g | 600 g | 675 g |
| FLEXCEM COMPONENT L ™ dithio carbamate | 6 g | 6 g | 6 g | 6 g | 8.4 g |
| Zinc Oxide | 30 g | 30 g | 30 g | 30 g | 13.5 g |
| Sulfur | 18 g | 18 g | 18 g | 18 g | 13.5 g |
| Stearic acid | — | — | — | — | 13.5 g |
| D-AIR3 ™ acetylenic alcohol | — | — | — | — | — |
| SSA-1 ™ silica flour | — | — | — | — | — |
| ZONE SEAL 2000 ™ surfactant | — | — | — | — | 20 g |
| MICROSAND ™ crystalline silica | — | — | 200 g | 200 g | 600 g |
| 434C ™ ethoxylated alcohol | — | — | — | — | — |
| AQF-2 ™ surfactant | 10 g | — | — | — | — |
| HC-2 ™ surfactant | 5 g | 5 g | 12 g | 20 g | — |
| HOWCO SUDS ™ surfactant | — | — | — | — | — |
| CFAS ™ ammonium decasulfate | — | 10 g | — | — | — |

TABLE 3B-continued

| Components | Batch 8 | Batch 9 | Batch 10 | Batch 11 | Batch 12 |
|---|---|---|---|---|---|
| Comments | Unstable foam | Unstable foam | Unstable foam | Foamed and placed in cell for 48 hours at 150° F.; set stable foam | Foamed and placed in cell; heated to 190° F. for 2 hours; sand settled from top 1–2 inches of 8 inch column |

TABLES 3A and 3B show that the eleventh and twelfth batches set.

EXAMPLE 4

To test curing properties of the first embodiment, 300 grams of LATEX 2000™ latex, 2 grams D-AIR3™ acetylenic alcohol, and components in the amounts listed in TABLE 4 were added to form eight batches. Each of the batches was mixed in a Waring blender. The batches were poured into receptacles and incubated in a 150° F. water bath.

TABLE 4

| Component | Batch 1 | Batch 2 | Batch 3 | Batch 4 | Batch 5 | Batch 6 | Batch 7 | Batch 8 |
|---|---|---|---|---|---|---|---|---|
| FLEXCEM COMPONENT L ™ dithio carbamate | 3 g | 3 g | 3 g | — | — | — | — | 3 g |

TABLE 4-continued

| Component | Batch 1 | Batch 2 | Batch 3 | Batch 4 | Batch 5 | Batch 6 | Batch 7 | Batch 8 |
|---|---|---|---|---|---|---|---|---|
| Zinc Oxide | — | 15 g | 15 g | 15 g | 15 g | — | — | — |
| Sulfur | 9 g | — | 9 g | 9 g | — | 9 g | — | — |
| Stearic acid | 3 g | 3 g | — | 3 g | — | — | 3 g | — |
| Comments | No set | No set | Set | No set | No set | No set | No set | No set |

TABLE 4 shows that the fourth batch set.

EXAMPLE 5

To test shear bond properties of the first embodiment, 450 grams of LATEX 2000™ latex, 1.5 grams of FLEXCEM COMPONENT L™ dithio carbamate, 2 grams of D-AIR3™ acetylenic alcohol, and components in the amounts listed in TABLE 5 were added to form eight batches. Each of the batches was mixed in a Waring blender. The batches were poured into receptacles and incubated before having their shear bond strengths tested. Batches 1–4 were tested after incubation for 48 hours at 200° F. Batches 5–8 were tested after incubation for 12 days at 200° F.

In a conventional shear bond test, the batches were placed in metal cylinders with a metal bar disposed in each of the cylinders. Once a batch set, the bar was supported and positioned by the composition. Shear bond strength was determined by the force required to push the bar out of the cylinder. The shear bond testing method is conventional, and is described in a paper by L. G. Carter and G. W. Evans entitled "A Study of Cement-Pipe Bonding," presented at the Society of Petroleum Engineers California Regional Meeting, held in Santa Barbara, Calif., on Oct. 24–25, 1963.

TABLE 5

| Component | Batch 1 | Batch 2 | Batch 3 | Batch 4 | Batch 5 | Batch 6 | Batch 7 | Batch 8 |
|---|---|---|---|---|---|---|---|---|
| Zinc Oxide | 13.5 g | 13.5 g | 27 g | 27 g | 13.5 g | 13.5 g | 13.5 g | 13.5 g |
| Sulfur | 9 g | 18 g | 9 g | 18 g | 9 g | 9 g | 9 g | 9 g |
| SSA-1 ™ silica flour | 600 g | 600 g | 600 g | 600 g | — | 200 g | 400 g | 600 g |
| Shear bond | 21 psi | 14 psi | 26 psi | 22 psi | 11 psi | 28 psi | 34 psi | 34 psi |

TABLE 5 shows that all the batches bond to metal. Batch 1 also shear bond strengths of 40 psi at 72 hours, 38 psi at 96 hours, and 55 psi at 30 days.

EXAMPLE 6

To test thickening times (TT) for reaching viscosities of 70 BC for the first embodiment, 600 grams of LATEX 2000™ latex, 3 grams of D-AIR3™ acetylenic alcohol, and components listed in the amounts listed in TABLE 6 were added to form ten batches. Each of the batches was mixed in a Waring blender. The batches were poured into receptacles and incubated at the temperatures listed in TABLE 6.

TABLE 6

| Component | Bat. 1 | Bat. 2 | Bat. 3 | Bat. 4 | Bat. 5 | Bat. 6 | Bat. 7 | Bat. 8 | Bat. 9 | Bat. 10 |
|---|---|---|---|---|---|---|---|---|---|---|
| FLEXCEM COMPONENT L ™ dithio carbamate | 6 g | 0.75 g | 0.75 g | 1.1 g | 0.75 g | 1 g | 1 g | 2 g | — | — |
| Zinc Oxide | 30 g | 3 g | 6 g | 12 g | 18 g | 18 g | 18 g | 18 g | 18 g | 18 g |

TABLE 6-continued

| Component | Bat. 1 | Bat. 2 | Bat. 3 | Bat. 4 | Bat. 5 | Bat. 6 | Bat. 7 | Bat. 8 | Bat. 9 | Bat. 10 |
|---|---|---|---|---|---|---|---|---|---|---|
| Sulfur | 18 g | 12 g | 12 g | 12 g | 12 g | 12 g | 12 g | 12 g | 12 g | 12 g |
| Stearic acid | 6 g | 6 g | 6 g | 6 g | 6 g | 12 g | — | — | 12 g | — |
| TT (hr:min) at 150° F. | 1:39; 1:53 | 12+ | 10:26 | 8:20 | 7:37 | 7:44 | 6:00 | 3:39 | — | — |
| TT (hr:min) at 200° F. | — | — | — | — | — | 1:59 | 1:45 | 1:35 | 6:42 | 11+ |

TABLE 6 shows that the set up times can be controlled by varying the amounts of components.

EXAMPLE 7

To test applied pressure for the first and second embodiments, LATEX 2000™ latex, and components listed in the amounts listed in TABLE 7 were added to form three batches. Each of the batches was mixed in a Waring blender.

The first batch, representing the first embodiment, was poured into a test cell, which was sealed and heated to 200° F. for 72 hours. After 72 hours, a valve positioned under a 325 mesh screen on the bottom of the test cell was opened, and a force of 1000 psi was applied to the test cell via a piston from the top of the cell. After approximately an hour, the volume of the batch had reduced by an amount listed in TABLE 7.

The second batch, representing the second embodiment, was poured into a test cell, which was sealed and heated to 170° F. After 48 hours, a force of 1000 psi was applied to the test cell via a piston, and the volume of the batch had reduced by an amount listed in TABLE 7. After seven days, pressure was released, and the volume of the batch returned to 85% of its original size.

The third batch, representing the second embodiment, was poured into a test cell, heated to 170° F., and thereafter, a force of 1000 psi was applied to the test cell via a piston. The t* volume of the batch was reduced by an amount listed in TABLE 7. After twenty four hours, pressure was released, and the volume of the batch returned to its original size. Thereafter, a force of 1000 psi was applied again and the volume of the batch was reduced by an amount listed in TABLE 7. After twenty four hours, pressure was again released, and the volume of the batch returned to 88% of its original size.

TABLE 7

| Component | Batch 1 Non-foamed Latex | Batch 2 Set Foamed Latex | Batch 3 Liquid Foam Latex |
|---|---|---|---|
| LATEX 2000 ™ latex | 450 g | 600 g | 600 g |
| FLEXCEM COMPONENT L ™ dithio carbamate | 1.5 g | 6 g | 6 g |
| Zinc Oxide | 13.5 g | 30 g | 30 |
| Sulfur | 9 g | 18 g | 6 g |
| HC-2 ™ surfactant | — | 20 g | 20 g |
| SSA-1 ™ silica flour | 400 g | — | — |
| Volume reduction | 30% | 40% | 36% |

TABLE 7 shows that the first embodiment is compressible in its set state when placed against a porous geological formation, and the second embodiment is compressible in both set and unset states when placed in a sealed system.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

What is claimed is:

1. A method of sealing a subterranean zone penetrated by a well bore comprising:
   preparing a sealing composition comprising latex, dithio carbamate, zinc oxide, sulfur and acetylenic alcohol;
   placing the sealing composition into the subterranean zone; and
   allowing the sealing composition to set therein.

2. The method of claim 1 wherein the latex is a styrene/butadiene copolymer latex emulsion.

3. The method of claim 2 wherein the latex has a styrene/butadiene weight ratio of about 25:75, with the styrene/butadiene copolymer suspended in a 50% by weight aqueous emulsion.

4. The method of claim 1 wherein the latex is present in a range of 41% to 90% by weight of the sealing composition.

5. The method of claim 1 wherein the dithio carbamate is present in a range of 0.1% to 2% by weight of the latex in the sealing composition.

6. The method of claim 1 wherein the zinc oxide is present in a range of 2% to 5% by weight of the latex in the sealing composition.

7. The method of claim 1 wherein the sulfur is present in a range of 1% to 4% by weight of the latex in the sealing composition.

8. The method of claim 1 wherein the sealing composition further comprises stearic acid.

9. The method of claim 8 wherein the stearic acid is present in a range of 0.1% to 2% by weight of the latex in the sealing composition.

10. The method of claim 1 wherein the sealing composition further comprises a weighting agent.

11. The method of claim 10 wherein the weighting agent is present in a range of 0.1% to 150% by weight of the latex in the sealing composition.

12. The method of claim 1 wherein the acetylenic alcohol is present in a range of 0.001% to 0.2% by weight of the latex in the sealing composition.

13. The method of claim 1 wherein the sealing composition further comprises a foaming agent.

14. The method of claim 13 wherein the foaming agent is present in a range of 2% to 4% by weight of the latex in the sealing composition.

15. A composition for sealing a subterranean zone penetrated by a well bore comprising:
   latex, dithio carbamate, zinc oxide, sulfur and acetylenic alcohol.

16. The sealing composition of claim 15 wherein the latex is a styrene/butadiene copolymer latex emulsion.

17. The sealing composition of claim 16 wherein the latex has a styrene/butadiene weight ratio of about 25:75, with the styrene/butadiene copolymer suspended in a 50% by weight aqueous emulsion.

18. The sealing composition of claim 15 wherein the latex is present in a range of 41% to 90% by weight of the sealing composition.

19. The sealing composition of claim 15 wherein the dithio carbamate is present in a range of 0.1% to 2% by weight of the latex in the sealing composition.

20. The sealing composition of claim 15 wherein the zinc oxide is present in a range of 2% to 5% by weight of the latex in the sealing composition.

21. The sealing composition of claim 15 wherein the sulfur is present in a range of 1% to 4% by weight of the latex in the sealing composition.

22. The sealing composition of claim 15 further comprising stearic acid.

23. The sealing composition of claim 22 wherein the stearic acid is present in a range of 01% to 2% by weight of the latex in the sealing composition.

24. The sealing composition of claim 15 further comprising a weighting agent.

25. The sealing composition of claim 24 the weighting agent is present in a range of 0.1% to 150% by weight of the latex in the sealing composition.

26. The sealing composition of claim 15 wherein the acetylenic alcohol is present in a range of 0.001% to 0.2% by weight of the latex in the sealing composition.

27. The sealing composition of claim 15 further comprising a foaming agent.

28. The sealing composition of claim 27 wherein the foaming agent is present in a range of 2% to 4% by weight of the latex in the sealing composition.

29. A method of sealing a subterranean zone penetrated by a well bore comprising:

preparing a sealing composition consisting essentially of latex, dithio carbamate, zinc oxide, and sulfur;

placing the sealing composition into the subterranean zone; and allowing the sealing composition to set therein.

30. The method of claim 29 wherein the latex is a styrene/butadiene copolymer latex emulsion.

31. The method of claim 30 wherein the latex has a styrene/butadiene weight ratio of about 25:75, with the styrene/butadiene copolymer suspended in a 50% by weight aqueous emulsion.

32. The method of claim 29 wherein the latex is present in a range of 41% to 90% by weight of the sealing composition.

33. The method of claim 29 wherein the dithio carbamate is present in a range of 0.1% to 2% by weight of the latex in the sealing composition.

34. The method of claim 29 wherein the zinc oxide is present in a range of 2% to 5% by weight of the latex in the sealing composition.

35. The method of claim 29 wherein the sulfur is present in a range of 1% to 4% by weight of the latex in the sealing composition.

36. The method of claim 29 wherein the sealing composition further consists essentially of stearic acid.

37. The method of claim 36 wherein the stearic acid is present in a range of 0.1% to 2% by weight of the latex in the sealing composition.

38. The method of claim 29 wherein the sealing composition further consists essentially of a weighting agent.

39. The method of claim 38 wherein the weighting agent is present in a range of 0.1% to 150% by weight of the latex in the sealing composition.

40. The method of claim 29 wherein the sealing composition further consists essentially of a foaming agent.

41. The method of claim 40 wherein the foaming agent is present in a range of 2% to 4% by weight of the latex in the sealing composition.

42. A composition for sealing a subterranean zone penetrated by a well bore consisting essentially of latex, dithio carbamate, zinc oxide, and sulfur.

43. The sealing composition of claim 42 wherein the latex is a styrene/butadiene copolymer latex emulsion.

44. The sealing composition of claim 43 wherein the latex has a styrene/butadiene weight ratio of about 25:75, with the styrene/butadiene copolymer suspended in a 60% by weight aqueous emulsion.

45. The sealing composition of claim 42 wherein the latex is present in a range of 41% to 90% by weight of the sealing composition.

46. The sealing composition of claim 42 wherein the dithio carbamate is present in a range of 0.1% to 2% by weight of the latex in the sealing composition.

47. The sealing composition of claim 42 wherein the zinc oxide is present in a range of 2% to 5% by weight of the latex in the sealing composition.

48. The sealing composition of claim 42 wherein the sulfur is present in a range of 1% to 4% by weight of the latex in the sealing composition.

49. The sealing composition of claim 42 further consisting essentially of stearic acid.

50. The sealing composition of claim 49 wherein the stearic acid is present in a range of 0.1% to 2% by weight of the latex in the sealing composition.

51. The sealing composition of claim 42 further consisting essentially of a weighting agent.

52. The sealing composition of claim 51 wherein the weighting agent is present in a range of 0.1% to 150% by weight of the latex in the sealing composition.

53. The sealing composition of claim 42 further consisting essentially of a foaming agent.

54. The sealing composition of claim 53 wherein the foaming agent is present in a range of 2% to 4% by weight of the latex in the sealing composition.

* * * * *